United States Patent
Ebstyne et al.

(10) Patent No.: US 11,250,321 B2
(45) Date of Patent: Feb. 15, 2022

(54) IMMERSIVE FEEDBACK LOOP FOR IMPROVING AI

(71) Applicant: Microsoft Technology Licensing, LLC, Redmond, WA (US)

(72) Inventors: Michael Ebstyne, Redmond, WA (US); Pedro Urbina Escos, Redmond, WA (US); Yuri Pekelny, Seattle, WA (US); Emanuel Shalev, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 945 days.

(21) Appl. No.: 15/974,651

(22) Filed: May 8, 2018

(65) Prior Publication Data

US 2019/0347547 A1     Nov. 14, 2019

(51) Int. Cl.
*G06N 3/08*     (2006.01)
*G06T 17/00*     (2006.01)

(52) U.S. Cl.
CPC .............. *G06N 3/08* (2013.01); *G06T 17/00* (2013.01)

(58) Field of Classification Search
CPC ........ G06N 3/08; G06T 17/00; G06K 9/6256; G06K 9/00624; G06K 9/6253
See application file for complete search history.

(56) References Cited

U.S. PATENT DOCUMENTS

| | | | |
|---|---|---|---|
| 10,235,601 B1* | 3/2019 | Wrenninge | G06K 9/6256 |
| 2018/0025640 A1* | 1/2018 | Micks | G06K 9/00812 |
| | | | 340/932.2 |
| 2018/0268256 A1* | 9/2018 | Di Febbo | G06K 9/6273 |

OTHER PUBLICATIONS

Chang, et al., "Matterport3D: Learning from RGB-D Data in Indoor Environments", In Proceedings of International Conference on 3D Vision, Oct. 10, 2017, pp. 667-676.
"International Search Report and Written Opinion Issued in PCT Application No. PCT/US2019/030090", dated Aug. 9, 2019, 13 Pages.

* cited by examiner

*Primary Examiner* — Xilin Guo

(57) ABSTRACT

An immersive feedback loop is disclosed for improving artificial intelligence (AI) applications used for virtual reality (VR) environments. Users may iteratively generate synthetic scene training data, train a neural network on the synthetic scene training data, generate synthetic scene evaluation data for an immersive VR experience, indicate additional training data needed to correct neural network errors indicated in the VR experience, and then generate and retrain on the additional training data, until the neural network reaches an acceptable performance level.

20 Claims, 11 Drawing Sheets

IMMERSIVE FEEDBACK LOOP FOR IMPROVING AI

BACKGROUND

Virtual reality (VR) environments can be used in the process of creating artificial intelligence (AI) models on top of machine sensory systems raw data. AI models may be used to interpret machine sensory systems' raw data and provide environment understanding information which can then be used in certain applications. As one example, a security camera application may recognize certain objects in order to issue alerts. When developing AI models for machine sensory systems, training data is needed that includes both sensor raw data and ground truth data that specifies objects or signals within the raw sensor data that the AI should recognize. An AI training operation may use one set of raw sensor data and ground truth data for training a neural net, and a scoring or evaluation operation may use another set of imagery and ground truth data. Thus, large data sets may be required.

With a manual data collection process, developers typically (a) collect imagery, (b) segment the imagery into pixel map regions, and (c) define at least some of the segmented regions as objects in the resulting ground truth data. Generating ground truth (GT) labels for sensor data is a labor-intensive process that is difficult to scale. Additionally, AI computer vision models are often developed in an iterative fashion that starts with an exploratory phase and ends with a phase of stressing a synthetic object under test. Each stage is predicated on access to data that represents core dependencies: the sensors, the environment in which the sensors are moving, and the motion of the sensors. In order to obtain the required feedback, developers traditionally perform a slow iterative loop: building hardware prototypes, running field captures, manually labeling frames of the captured data, ingesting the data into the cloud, developing algorithms to generate inference models from the data, deploying the inference models onto real-world devices, and then testing the modeled devices back in the real-world. This typically requires a substantial amount of hardware and developer time, expensive equipment, and significant coordination.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Some aspects disclosed herein are directed to using an immersive feedback loop for improving artificial intelligence (AI) applications used for virtual reality (VR) environments. Users may iteratively generate synthetic scene training data, train a neural network on the synthetic scene training data, generate synthetic scene evaluation data for an immersive VR experience, indicate additional training data needed to correct neural network errors indicated in the VR experience, and then generate and retrain on the additional training data, until the neural network reaches an acceptable performance level. A synthetic scene generator for may be configured to generate synthetic scene data comprising a first set of synthetic sensor data and a first ground truth data and a second set of synthetic sensor data and second ground truth data. A neural network trainer is used for training a neural network for machine vision using the first set of synthetic sensor data and ground truth data. A model evaluator identifies objects in the second set of synthetic sensor data by using the neural network, and compares the identified objects in the second set of synthetic sensor data with the second ground truth data to determine errors in the identification of objects by the neural network. And an immersive explorer service operates to generate a VR environment using the second synthetic scene data, indicate the errors within the VR environment, receive feedback indicating additional training data corresponding to the indicated errors, and indicate the additional training data to the synthetic scene generator.

Some aspects disclosed herein are directed to training a neural network using synthetic scene data and corresponding ground truths. To do so, a first synthetic scene data comprising a first set of synthetic sensor data and a first ground truth data is generated. The neural network is trained using the first synthetic scene data. Second synthetic scene data comprising a second set of synthetic sensor data and a second ground truth data is generated. Objects in the second set of synthetic sensor data are identified using the neural network. A VR environment is generated using the second synthetic scene data, and the identified objects in the second set of synthetic sensor data are compared with the second ground truth data to determine errors in the identification of objects by the neural network. A user may view the VR environment to visibly inspect the synthetic scene for issues. For example, the user may view a 3D synthetic view of a room and notice that only half of a table is rendered correctly, which may in turn prompt the user submit feedback. Based on the comparison, errors may visibly be identified within the VR environment by the user, and feedback on the errors submitted directly through the VR interface. The user's feedback may be used to indicate training data corresponding to the indicated errors; responsive to receiving the indication of additional training data for use in future synthetic generation.

BRIEF DESCRIPTION OF THE DRAWINGS

The disclosed examples are described in detail below with reference to the accompanying drawing figures listed below.

DETAILED DESCRIPTION

Figure 1:
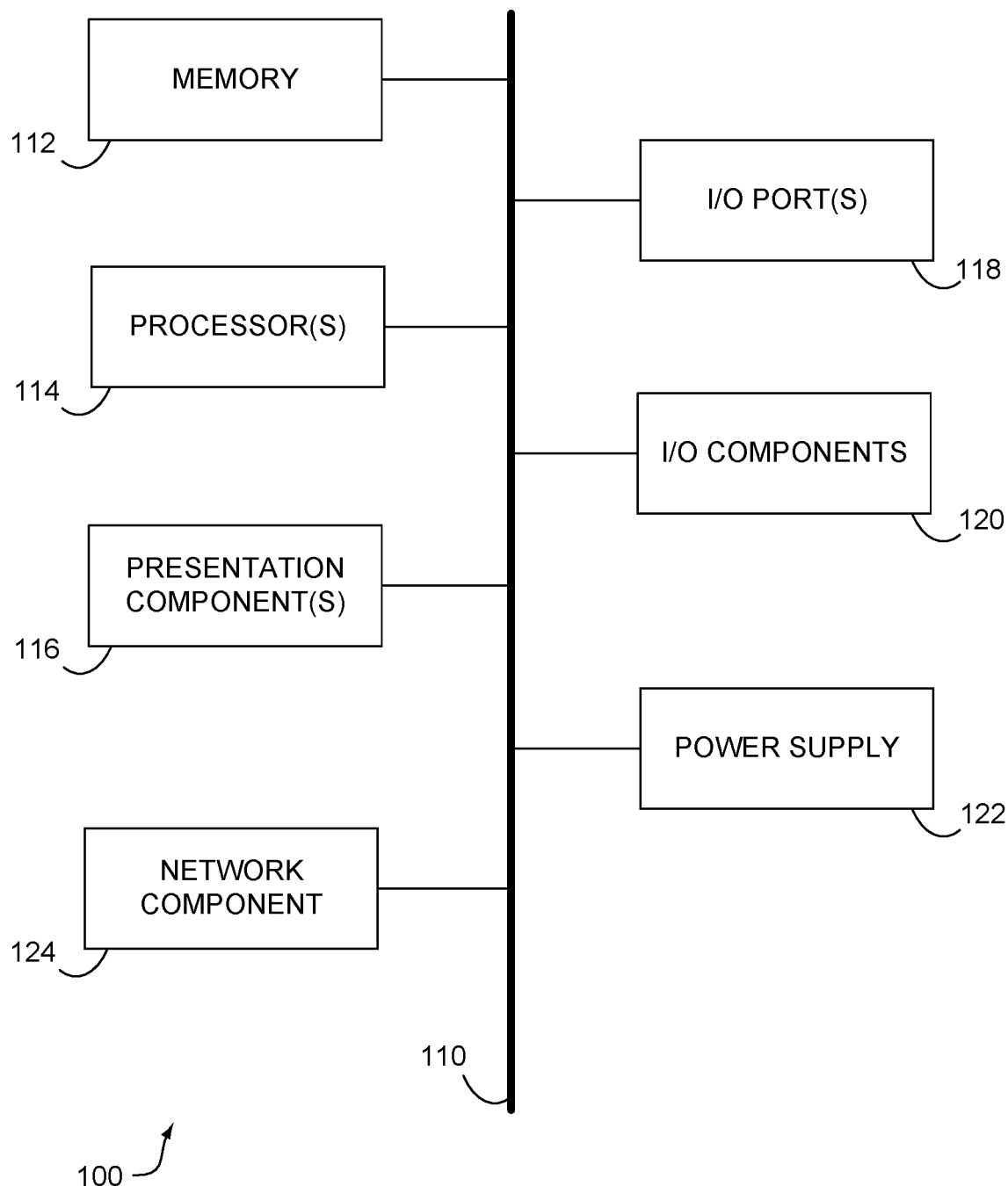
FIG. 1 is a block diagram of an example computing environment suitable for implementing some of the various examples disclosed herein.

The various embodiments will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

With a synthetics service, a modeled scene starts with a defined set of virtual objects (such as a CAD model of a room containing objects), and when the synthetic imagery is produced, the ground truth (GT) data is already known. Thus, it may be faster and less expensive to use a virtual camera to collect training and evaluation data sets in synthetic scenes for large numbers of collection variations, such as lighting variations, noise variations, object repositioning and obscuration, and sensor configurations. After training, an evaluation step may generate new synthetic imagery during a live session that shows the scene from different angles than were used for training. This produces a live rendering of the neural network errors which can be interacted with by a user.

Leveraging VR to both generate training data and also permit evaluation of the training, to identify which objects may require further training efforts, can facilitate an immersive feedback loop for improving AI applications. That is, VR may be used as part of a loop to study interim results of the neural network training, and then guide the training based on errors identified during evaluation of the data models. One example may be that AI recognition fails for a partially obscured object or an object viewed from anew angle, so during the development process, a user can readily identify that additional training is needed on that particular class of objects.

Therefore, embodiments are disclosed for using an immersive feedback loop for improving AI applications used for mixed reality (MR) environments, such as a three-dimensional (3D) computer vision classifier. Users may iteratively generate synthetic scene training data, train a neural network on the synthetic scene training data, generate synthetic scene evaluation data for an immersive VR experience, indicate additional training data needed to correct neural network errors indicated in the VR experience, and then generate and retrain on the additional training data, until the neural network reaches an acceptable performance level. Essentially, the VR experience will simulate an MR experience, interpreting raw data from augmented reality (AR) devices.

Users (developers) are able to view scenes in VR to quickly (and visually) ascertain whether their AI models/inferences are working properly. The user can inspect objects in a synthetic scene that are not being rendered correctly and quickly correct it by specifying that more training data is needed for the particular object in that portion of the scene. The users can interact with and manipulate objects and preview the classifier performance while in the virtual world. For example, in some embodiments, users may flex and geometrically explode variants of key factors that would update or improve the underlying model. Or, in other examples, users may view, in a VR representation, a synthetic scene and quickly identify objects that are not correctly generated or rendered. Feedback from may be gathered during the VR session and used to improve the AI algorithms and models being used.

FIG. 1 is a block diagram of an example computing device 100 for implementing aspects disclosed herein, and is designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components/modules illustrated.

The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The discloses examples may be practiced in a variety of system configurations, including personal computers, laptops, smart phones, mobile tablets, hand-held devices, consumer electronics, specialty computing devices, etc. The disclosed examples may also be practiced in distributed computing environments, such as those disclosed in FIG. 2 described in more detail below, where tasks are performed by remote-processing devices that are linked through a communications network.

Computing device 100 includes a bus 110 that directly or indirectly couples the following devices: computer-storage memory 112, one or more processors 114, one or more presentation components 116, input/output (I/O) ports 118, I/O components 120, a power supply 122, and a network component 124. Computer device 100 should not be interpreted as having any dependency or requirement related to any single component or combination of components illustrated therein. While computer device 100 is depicted as a seemingly single device, multiple computing devices 100 may work together and share the depicted device resources. For instance, computer-storage memory 112 may be distributed across multiple devices, processor(s) 114 may provide housed on different devices, and so on.

Bus 110 represents what may be one or more busses (such as an address bus, data bus, or a combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and reiterate that the diagram of FIG. 1 is merely illustrative of an exemplary computing device that can be used in connection with one or more embodiments of the present invention. Distinction is not made between such categories as "workstation," "server,"

"laptop," "hand-held device," etc., as all are contemplated within the scope of FIG. 1 and the references herein to a "computing device."

Computer-storage memory 112 may take the form of the computer-storage media references below and operatively provide storage of computer-readable instructions, data structures, program modules and other data for the computing device 100. For example, computer-storage memory 112 may store an operating system, a universal application platform, or other program modules and program data. Computer-storage memory 112 may be used to store and access instructions configured to carry out the various operations disclosed herein.

As mentioned below, computer-storage memory 112 may include computer-storage media in the form of volatile and/or nonvolatile memory, removable or non-removable memory, data disks in virtual environments, or a combination thereof. And computer-storage memory 112 may include any quantity of memory associated with or accessible by the display device 100. The memory 112 may be internal to the display device 100 (as shown in FIG. 1), external to the display device 100 (not shown), or both (not shown). Examples of memory 112 in include, without limitation, random access memory (RAM); read only memory (ROM); electronically erasable programmable read only memory (EEPROM); flash memory or other memory technologies; CDROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the display device 100. Additionally or alternatively, the computer-storage memory 112 may be distributed across multiple display devices 100, e.g., in a virtualized environment in which instruction processing is carried out on multiple devices 100. For the purposes of this disclosure, "computer storage media," "computer-storage memory," "memory," and "memory devices" are synonymous terms for the computer-storage media 112, and none of these terms include carrier waves or propagating signaling.

Processor(s) 114 may include any quantity of processing units that read data from various entities, such as memory 112 or I/O components 120. Specifically, processor(s) 114 are programmed to execute computer-executable instructions for implementing aspects of the disclosure. The instructions may be performed by the processor, by multiple processors within the computing device 100, or by a processor external to the client computing device 100. In some examples, the processor(s) 114 are programmed to execute instructions such as those illustrated in the flowcharts discussed below and depicted in the accompanying drawings. Moreover, in some examples, the processor(s) 114 represent an implementation of analog techniques to perform the operations described herein. For example, the operations may be performed by an analog client computing device 100 and/or a digital client computing device 100.

Presentation component(s) 116 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 100, across a wired connection, or in other ways.

Ports 118 allow computing device 100 to be logically coupled to other devices including I/O components 120, some of which may be built in. Examples I/O components 120 include, for example but without limitation, a microphone, joystick, game pad, satellite dish, scanner, printer, wireless device, etc.

Figure 2:
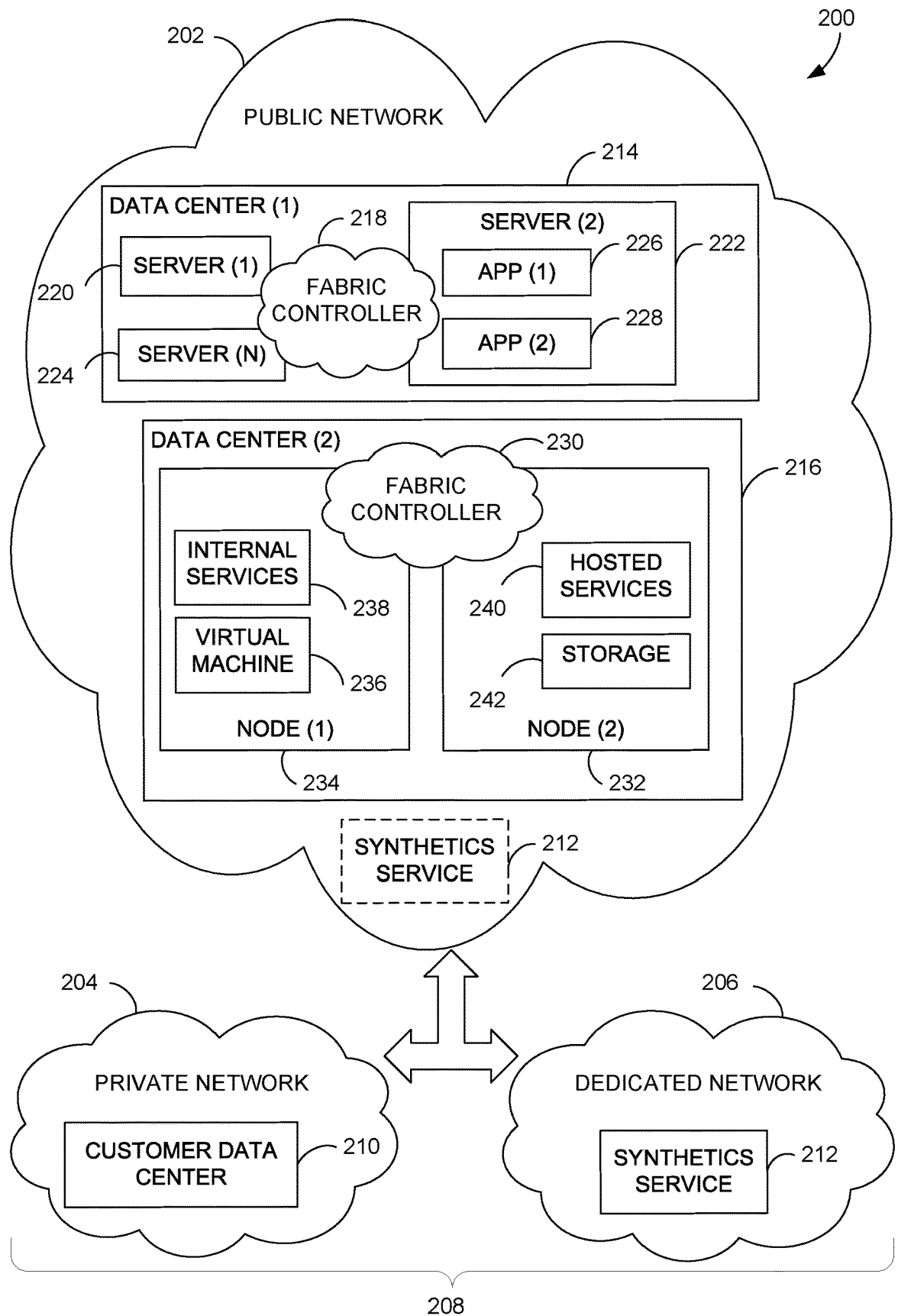
FIG. 2 is a block diagram of an example cloud-computing infrastructure suitable for a synthetics service implementing some of the various examples disclosed herein.
Figure 5:
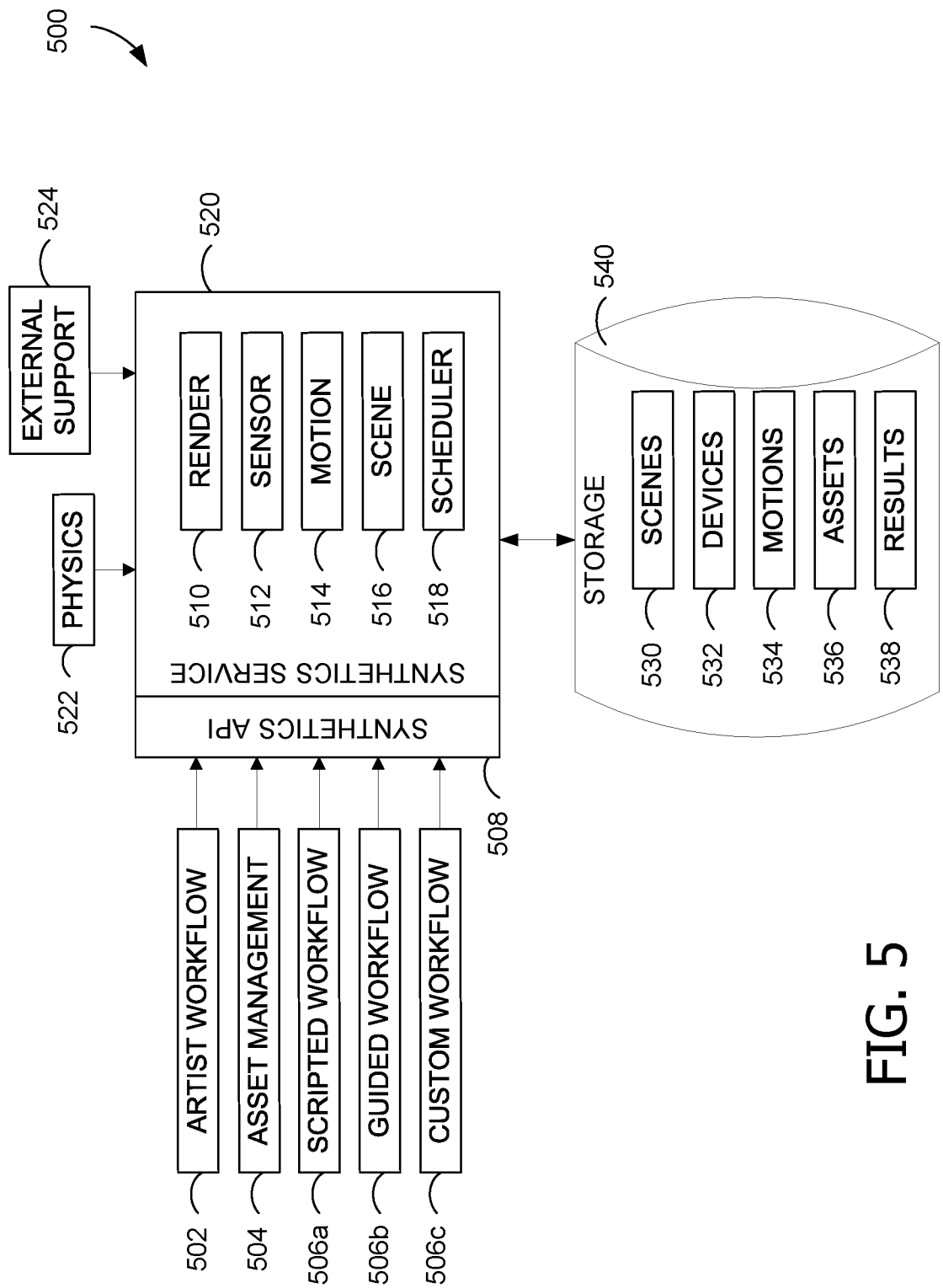
FIG. 5 is a block diagram of an architecture for creating synthetic imagery, according to some of the various examples disclosed herein.

The computing device 100 may operate in a networked environment via the network component 124 using logical connections to one or more remote computers, such as those shown in FIGS. 2 and 5. In some examples, the network component 124 includes a network interface card and/or computer-executable instructions (e.g., a driver) for operating the network interface card. Communication between the computing device 100 and other devices may occur using any protocol or mechanism over any wired or wireless connection. In some examples, the network component 124 is operable to communicate data over public, private, or hybrid (public and private) using a transfer protocol, between devices wirelessly using short range communication technologies (e.g., near-field communication (NFC), BLUETOOTH branded communications, or the like), or a combination thereof.

Turning now to FIG. 2, an exemplary block diagram illustrates a cloud-computing environment for an immersive feedback loop for improving AI. Architecture 200 illustrates an exemplary cloud-computing infrastructure, suitable for use in implementing aspects of this disclosure. Architecture 200 should not be interpreted as having any dependency or requirement related to any single component or combination of components illustrated therein. In addition, any number of nodes, virtual machines, data centers, role instances, or combinations thereof may be employed to achieve the desired functionality within the scope of embodiments of the present disclosure.

The distributed computing environment of FIG. 2 includes a public network 202, a private network 204, and a dedicated network 206. Public network 202 may be a public cloud-based network of computing resources, for example. Private network 204 may be a private enterprise network or private cloud-based network of computing resources. And dedicated network 206 may be a third-party network or dedicated cloud-based network of computing resources. In some examples, private network 204 may host a customer data center 210, and dedicated network 206 may host cloud synthetics services 212, which are discussed in more detail below relative to FIG. 4.

Hybrid cloud 208 may include any combination of public network 202, private network 204, and dedicated network 206. For example, dedicated network 206 may be optional, with hybrid cloud 208 comprised of public network 202 and private network 204. Along these lines, some customers may opt to only host a portion of their customer data center 210 in the public network 202 and/or dedicated network 206, retaining some of the customers' data or hosting of customer services in the private network 204. For example, a customer that manages healthcare data or stock brokerage accounts may elect or be required to maintain various controls over the dissemination of healthcare or account data stored in its data center or the applications processing such data (e.g., software for reading radiology scans, trading stocks, etc.). Myriad other scenarios exist whereby customers may desire or need to keep certain portions of data centers under the customers' own management. Thus, in some examples, customer data centers may use a hybrid cloud 208 in which some data storage and processing is performed in the public network 202 while other data storage and processing is performed in the dedicated network 206.

Public network 202 may include data centers configured to host and support operations, including tasks of a distributed application, according to the fabric controller 218. It will be understood and appreciated that data center 214 and data center 216 shown in FIG. 2 are merely examples of suitable implementations for accommodating one or more distributed applications, and are not intended to suggest any limitation as to the scope of use or functionality of examples disclosed herein. Neither should data center 214 and data center 216 be interpreted as having any dependency or requirement related to any single resource, combination of resources, combination of servers (e.g., servers 220 and 224) combination of nodes (e.g., nodes 232 and 234), or a set of application programming interfaces (APIs) to access the resources, servers, and/or nodes.

Data center 214 illustrates a data center comprising a plurality of servers, such as servers 220 and 224. A fabric controller 218 is responsible for automatically managing the servers 220 and 224 and distributing tasks and other resources within the data center 214. By way of example, the fabric controller 218 may rely on a service model (e.g., designed by a customer that owns the distributed application) to provide guidance on how, where, and when to configure server 222 and how, where, and when to place application 226 and application 228 thereon. One or more role instances of a distributed application may be placed on one or more of the servers 220 and 224 of data center 214, where the one or more role instances may represent the portions of software, component programs, or instances of roles that participate in the distributed application. In other examples, one or more of the role instances may represent stored data that are accessible to the distributed application.

Data center 216 illustrates a data center comprising a plurality of nodes, such as node 232 and node 234. One or more virtual machines may run on nodes of data center 216, such as virtual machine 236 of node 234 for example. Although FIG. 2 depicts a single virtual node on a single node of data center 216, any number of virtual nodes may be implemented on any number of nodes of the data center in accordance with illustrative embodiments of the disclosure. Generally, virtual machine 236 is allocated to role instances of a distributed application, or service application, based on demands (e.g., amount of processing load) placed on the distributed application. As used herein, the phrase "virtual machine" is not meant to be limiting, and may refer to any software, application, operating system, or program that is executed by a processing unit to underlie the functionality of the role instances allocated thereto. Further, the virtual machine(s) 236 may include processing capacity, storage locations, and other assets within the data center 216 to properly support the allocated role instances.

In operation, the virtual machines are dynamically assigned resources on a first node and second node of the data center, and endpoints (e.g., the role instances) are dynamically placed on the virtual machines to satisfy the current processing load. In one instance, a fabric controller 230 is responsible for automatically managing the virtual machines running on the nodes of data center 216 and for placing the role instances and other resources (e.g., software components) within the data center 216. By way of example, the fabric controller 230 may rely on a service model (e.g., designed by a customer that owns the service application) to provide guidance on how, where, and when to configure the virtual machines, such as virtual machine 236, and how, where, and when to place the role instances thereon.

As described above, the virtual machines may be dynamically established and configured within one or more nodes of a data center. As illustrated herein, node 232 and node 234 may be any form of computing devices, such as, for example, a personal computer, a desktop computer, a laptop computer, a mobile device, a consumer electronic device, a server, the computing device 100 of FIG. 1, and the like. In one instance, the nodes 232 and 234 host and support the operations of the virtual machine(s) 236, while simultaneously hosting other virtual machines carved out for supporting other tenants of the data center 216, such as internal services 238 and hosted services 240. Often, the role instances may include endpoints of distinct service applications owned by different customers.

Typically, each of the nodes include, or is linked to, some form of a computing unit (e.g., central processing unit, microprocessor, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes to enable each device to perform a variety of processes and operations. In another instance, the computing unit may encompass a processor (not shown) coupled to the computer-readable medium (e.g., computer storage media and communication media) accommodated by each of the nodes.

The role of instances that reside on the nodes may be to support operation of service applications, and thus they may be interconnected via APIs. In one instance, one or more of these interconnections may be established via a network cloud, such as public network 202. The network cloud serves to interconnect resources, such as the role instances, which may be distributed across various physical hosts, such as nodes 232 and 234. In addition, the network cloud facilitates communication over channels connecting the role instances of the service applications running in the data center 216. By way of example, the network cloud may include, without limitation, one or more communication networks, such as local area networks (LANs) and/or wide area networks (WANs). Such communication networks are commonplace in offices, enterprise-wide computer networks, intranets, and the Internet, and therefore need not be discussed at length herein.

Figure 3:
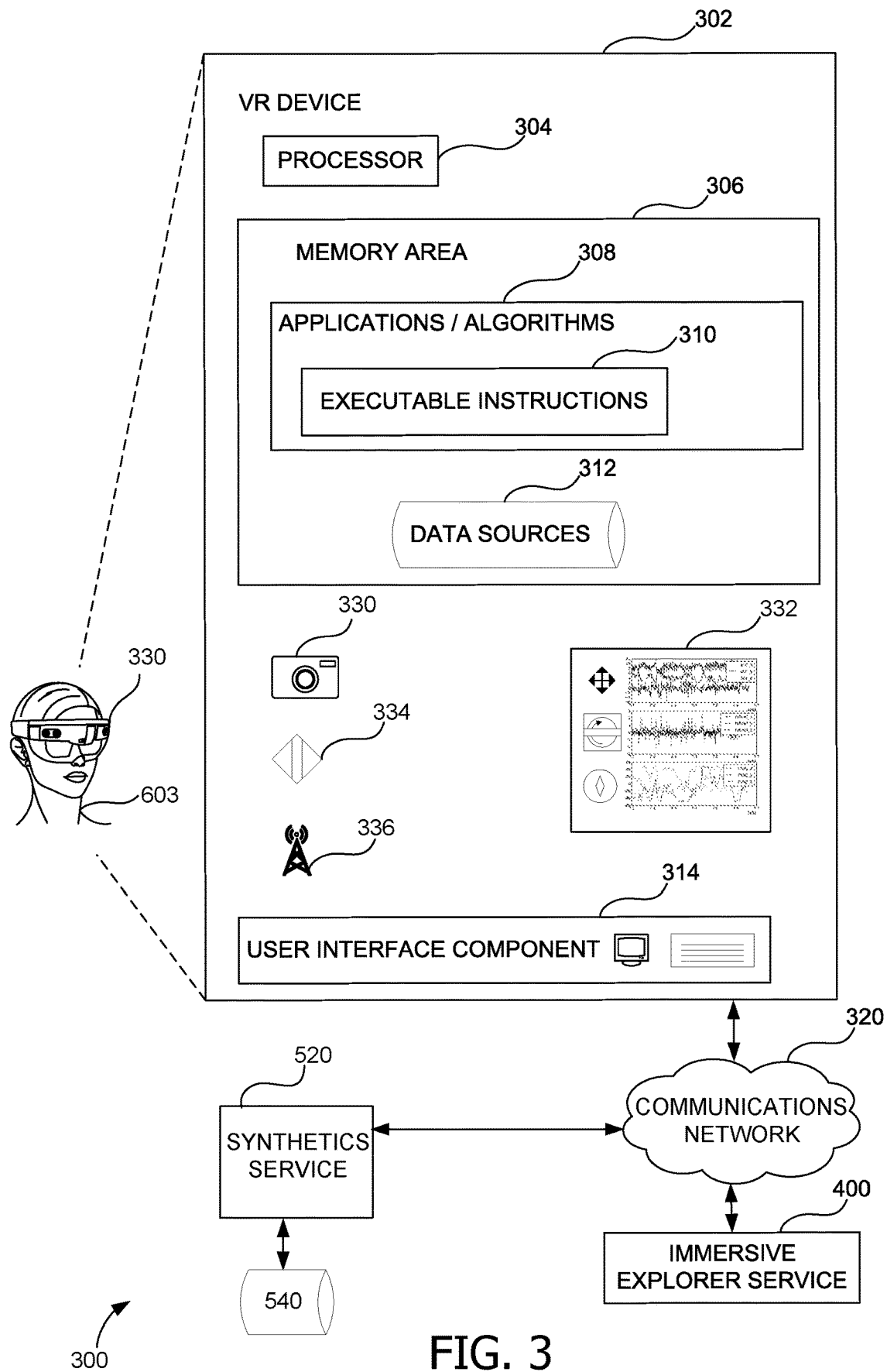
FIG. 3 is a block diagram of an example virtual reality (VR) headset, according to some of the various examples disclosed herein.

FIG. 3 is a block diagram of an example virtual reality (VR) device 302, for example a VR headset, according to some of the various examples disclosed herein. VR device 302 may alternatively take the form of a mobile computing device or any other portable device. In some examples, a mobile computing device includes a mobile telephone, laptop, tablet, computing pad, netbook, gaming device, wearable device, head mounted display (HMD) and/or portable media player. VR device 302 may also represent less portable devices such as desktop personal computers, kiosks, tabletop devices, industrial control devices, wireless charging stations, electric automobile charging stations, and other physical objects embedded with computing resources and/or network connectivity capabilities. Additionally, VR device 302 may represent a group of processing units or other computing devices, such as for example a combination of a desktop personal computer and an HMD in communication with the desktop personal computer. Although VR device 302 is illustrated as a single untethered device, it is common for some VR devices to leverage external machines for processing capacity.

In some examples, VR device 302 has at least one processor 304, a memory area 306, and at least one user interface component 314. These may be the same or similar to processor(s) 114 and memory 112 of FIG. 1, respectively. Processor 304 includes any quantity of processing units, and is programmed to execute computer-executable instructions for implementing aspects of the disclosure. The instructions may be performed by the processor 304 or by multiple processors within VR device 202, or performed by a processor external to VR device 202. In some examples, processor 304 is programmed to execute instructions such as those that may be illustrated in the others figures. In some examples, processor 304 represents an implementation of analog techniques to perform the operations described herein. For example, the operations may be performed by an analog computing device and/or a digital computing device.

VR device 302 further has one or more computer-storage media represented as memory area 306. Memory area 306 includes any quantity of computer-storage media associated with or accessible by the computing device. Memory area 306 may be internal to VR device 302 (as shown in FIG. 3), external to the computing device (not shown), or both (not shown). In some examples, memory area 306 includes read-only memory and/or memory wired into an analog computing device. Memory area 306 stores, among other data, one or more applications or algorithms 308 that include both data and executable instructions 310.

The applications, when executed by the processor, operate to perform functionality on the VR device 302. Exemplary applications include VR display and sensing of pose, gaze, movements, or other positioning for VR field of view control. The applications may communicate with counterpart applications or services such as web services accessible via a network, such as communications network 320. For example, the applications may represent downloaded client-side applications that correspond to server-side services executing in a cloud.

In some examples, applications generated by the disclosed embodiment may be configured to communicate with data sources and other computing resources in a cloud environment during runtime, or may share and/or aggregate data between client-side services and cloud services. Additionally or alternatively, memory area 306 may store data sources 312, which may represent data stored locally at memory area 306, data access points stored locally at memory area 306 and associated with data stored remote from VR device 302, or any combination of local and remote data.

The user interface component 314, may include instructions executed by processor 304 of VR device 302, and cause the processor 304 to perform operations, including to receive user selections during user interaction with universal application platform 308, for example. Portions of user interface component 314 may thus reside within memory area 306. In some examples, user interface component 314 includes a graphics card for displaying data to a user 330 and receiving data from user 330. User interface component 314 may also include computer-executable instructions (e.g., a driver) for operating the graphics card. Further, user interface component 314 may include a display (e.g., a touch screen display or natural user interface) and/or computer-executable instructions (e.g., a driver) for operating the display. In some examples the display may be a 3D display, such as may be found in an HMD.

User interface component 314 may also include one or more of the following to provide data to the user or receive data from the user: a keyboard (physical or touchscreen display), speakers, a sound card, a camera, a microphone, a vibration motor, one or more accelerometers, a BLUETOOTH brand communication module, global positioning system (GPS) hardware, and a photoreceptive light sensor. For example, the user may input commands or manipulate data by moving the computing device in a particular way. In another example, the user may input commands or manipulate data by providing a gesture detectable by the user interface component, such as a touch or tap of a touch screen display or natural user interface.

As illustrated, VR device 302 further includes a camera 330, which may represent a single camera, a stereo camera set, a set of differently-facing cameras, or another configuration. VR device 302 may be used for environment setup and inspection of interim AI results, so the position and orientation of VR device will be sensed or measured in order to control the VR display. To facilitate such measurements, VR device 302 may also further include an IMU 332 that may incorporate one or more of an accelerometer, a gyroscope, and/or a magnetometer. The accelerometer gyroscope, and/or a magnetometer may each output measurements in 3D. The combination of 3D position and 3D rotation may be referred to as six degrees-of-freedom (6DoF), and a combination of 3D accelerometer and 3D gyroscope data may permit 6DoF measurements. In general, linear accelerometer data may be the most accurate of the data from a typical IMU, whereas magnetometer data may be the least accurate.

As also illustrated, VR device 302 additionally includes a generic sensor 334 and a transceiver 336. Generic sensor 334 may include an infrared (IR) sensor, a light detection and ranging (LIDAR) sensor, an RGB-D sensor, an ultrasonic sensor, or any other sensor, including sensors associated with position-finding and range-finding. Transceiver 336 may include BLUETOOTH, WiFi, cellular, or any other radio or wireless system. Transceiver 336 may act as a sensor by detecting signal strength, direction-of-arrival and location-related identification data in received signals. Together, one or more of camera 330, IMU 332, generic sensor 334, and transceiver 336 may collect data for use in VR applications.

VR device 302 is shown as operating with an immersive explorer service 400 over communications network 320, which may be a wireless or wired connection. VR device 302 displays imagery to user 330 and receives input from user 330 via user interface component 314 to send to immersive explorer service 400. Immersive explorer service 400 will be described in relation to FIG. 4. Synthetics service 520 and database 540 will be described in relation to FIG. 5.

Figure 4:
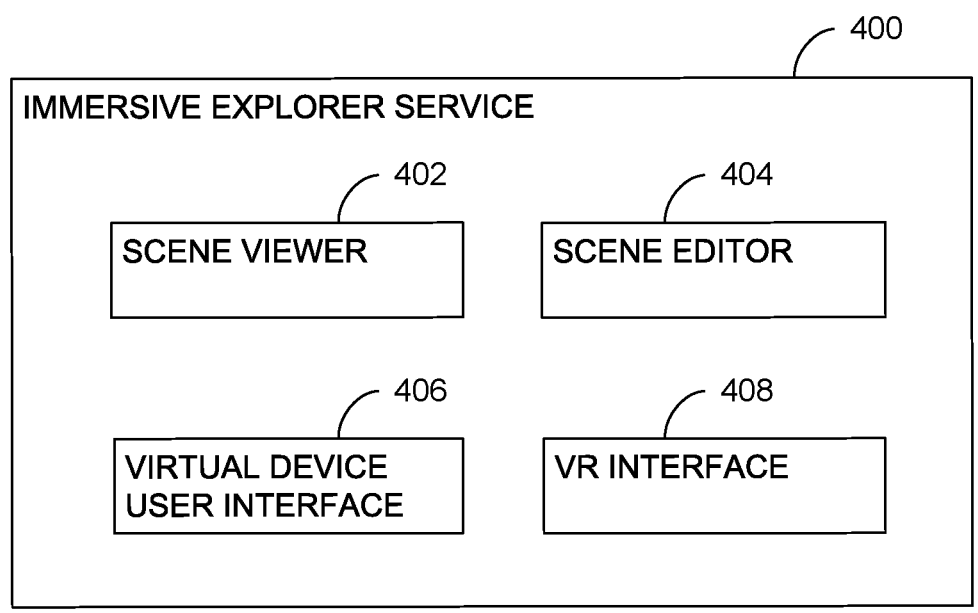
FIG. 4 is a block diagram of an immersive explorer service suitable for implementing some of the various examples disclosed herein.

FIG. 4 is a block diagram of an immersive explorer service 400 suitable for implementing some of the various examples disclosed herein. As illustrated, immersive explorer service 400 comprises a scene viewer 402, a scene editor 404, a virtual device user interface 406, and a VR interface. Functionality will be described for each illustrated portion in an exemplary embodiment, although it should be understood that various functionality described as being included within one portion may actually be implemented in a different portion or spread among multiple portions. Immersive explorer service 400 may be operated on a local computing node or as a cloud service.

Scene viewer 402 intakes synthetic scene images, object data, ground truth, and/or indications of error by a neural network model, and creates imagery for display to a user, perhaps in 3D. That is, scene viewer 402 combines image and error data for creating display information. Virtual device user interface 406 receives and processes input from users, for example user 330 of VR device 302 (see FIG. 3), such as system control, menu item selection, manipulate of objects, and other such input as may be needed for a user to interact with a VR world. Virtual device user interface 406 may also receive information regarding device motion (simulated and actual), and pose and positioning for VR field of view control. Scene editor 404 responds to user input received through virtual device user interface 406 to select and manipulate objects, for example permitting a user to rotate an object to ascertain whether it renders correctly from other angles, or to select an object for identifying that class of objects as requiring additional training. VR interface 408 interfaces with scene generation functionality to request scene images and forward control information and pose and positioning data. Effectively, VR interface 408 manages data and control to enable immersive explorer service 400 to provide a VR experience to a user.

Immersive explorer service 400 provides a VR view of a synthetic scene to permit users to study the data that underlies a 3D computer vision classifier. The users can interact with and manipulate objects, and preview the classifier results while in the virtual world. Further detail will be provided on the operation of immersive explorer service 400 in the descriptions of FIGS. 6, 7 and 9.

FIG. 5 is an illustration of an architecture 500 for creating synthetic imagery, according to some of the various examples disclosed herein. In architecture 500, several inputs, including an artist workflow 502, an asset management 504, and other workflows (a scripted workflow 506a, a guided workflow 506b, and a custom workflow 506c) interface via a synthetics API 508 to a synthetics service 520. Synthetics service 520 (synthetic simulation service) has multiple components or modules, including a renderer 510, a sensor modeler 512, a motion module 514, a scene generation module 516, and a scheduler 518. External functionality is illustrated as a physics service 522 and other external support 524, which may include off-loaded rendering computations. Synthetics service 520 includes at least these main core capabilities:

Asset ingestion, which includes artist workflows and, if a user desires to upload their own assets, synthetics service 520 can ingest the user data and verify compatibility with the simulation system.

Sensors/Devices plugin system so a user can implement custom sensors and device logics.

Synthetic simulation setup and environment manipulation for assembling the input to the simulation. A user can use assets in storage medium 540 to create and manipulate virtual environments, add devices or sensors in the environment, and define device/sensor movements.

Synthetic simulation enabling a user to run the experiment that has been set up, monitor the progress, and collect the results.

The generated synthetic imagery, scene data and other associated data may then be archived in a storage medium 540 for use in the described virtual experimentation. Storage medium 540 may be in a cloud environment or may connect to a cloud storage service. As illustrated, various data sets are stored, including the scene data 530, device data 532, motion data 534, asset data 536, and results 538. It should be understood that different functionalities may be internal or external services, and that FIG. 5 is only used for illustrative purposes. Together the various functionalities are able to intake virtual objects (assets), lighting models, orchestrated motion, camera and other sensor positions, to render synthetic (virtual) scene imagery.

Figure 6:
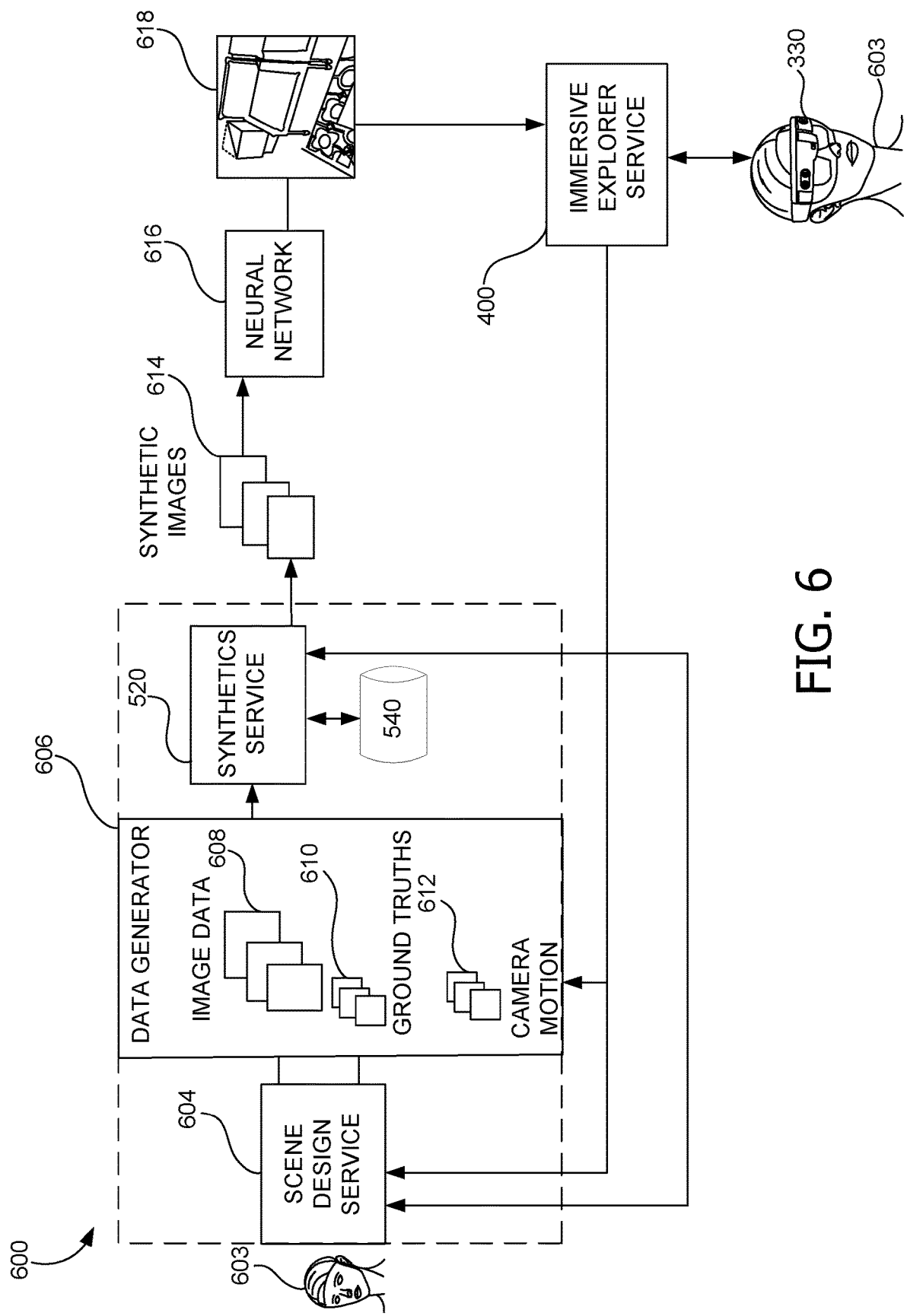
FIG. 6 is a block diagram of a synthetics engine that may advantageously employ feedback through an immersive explorer service, according to some of the various examples disclosed herein.

FIG. 6 is a block diagram of a synthetics engine 600 that may advantageously employ feedback through an immersive explorer service, according to some of the various examples disclosed herein. A user 603 uses a scene design service 604 to specify a set of virtual scenes for testing AI algorithms. Scene design service 604 inputs virtual object information, scene definitions, virtual camera information (such as field of view), motion information, and other information to a data generator 606. Data generator 606 produces a set of data 608 and ground truth data 610 along with camera motion data 612 that can be used to create synthetic imagery. Scene design service 604 may be a tool or service user interface (UI) component of data generator 606 and uses synthetic service 520 and database 540 to facilitate scene generation. The data sets are sent to synthetics service 520 (see FIG. 5) to produce a set of synthetic images 614 (synthetic sensor data) for use in training a neural network 616. In some embodiments, scene design service 604 synthetics service 520 (synthetics simulation service) may be considered to be a portion of data generator 606.

An exemplary resulting image is shown as image 618. The imagery may then be displayed, and the objects within the synthetic scene studied in immersive explorer service 400. Although this example describes training using synthetic imagery, it should be understood that more general synthetic sensor data (including detected signals) may be used in some embodiments. As illustrated, user 603 is wearing an HMD 330, which may be similar to VR device 302 of FIG. 3, and is interacting with immersive explorer service 400.

Immersive explorer service 400 permits user 603 to virtually move through the scene, studying and manipulating objects. For example, user 603 may use gestures as input to HMD 330 to control object manipulation, field of view, or other aspects of a VR experience. Such feedback controls operate by immersive explorer service 400 passing back user input or control information to both scene design service 604 and data generator 606 to instruct them how to create the new imagery to be viewed by user 603 on HMD 330.

Figure 7:
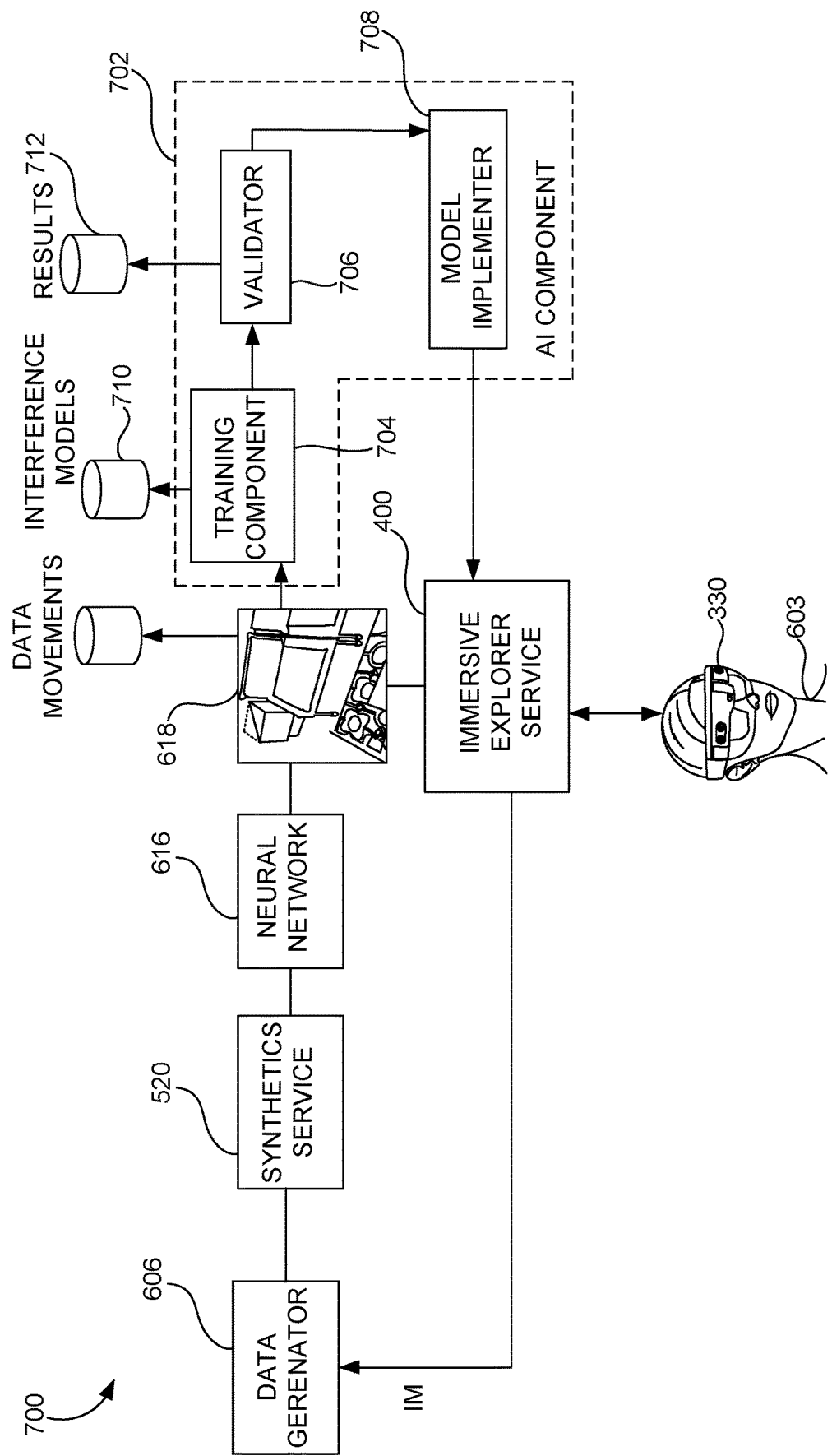
FIG. 7 is a flow diagram of a synthetics engine that may advantageously employ feedback through an immersive explorer service, according to some of the various examples disclosed herein.

FIG. 7 is a flow diagram 700 of a synthetics engine, (such as perhaps synthetics engine 600 of FIG. 6) that may advantageously employ feedback through an immersive explorer service, according to some of the various examples disclosed herein. As illustrated, data generator 606 passes scene generation data to synthetics service 520, which produces synthetic data for training neural network 616. An exemplary resulting image is shown as image 618. As described above for FIG. 6, an immersive explorer service 400 closes a feedback loop with data generator 606.

Data generator 606 produces frames (data moments) that may be input to an AI component 702 that comprises a training component 704, a validator 706, and a model implementer 708. Training component 704 may run a supervised learning training algorithm, which produces an inference model 710. An inference model 710 is input to validator 706, which tests the performance of inference model against a known reference set of data, and outputs the performance results 712. Ideally, the results will be sufficient the inference model can be deployed or published to an end user device. However, in the event that an inference model is not ready for publishing, it may be improved by iterating through a feedback loop via immersive explorer service 400, to identify additional training data that may be needed.

By using data generator 606 in conjunction with immersive explorer service 400, data scientists and computer vision researchers can both find inspiration on their current solution limitations, can generate improvements, and preview their solution in-band, without taking dependencies on other teams or having to go to real-world places or wait for the availability of real-world prototypes. Immersive explorer service 400 provides a VR experience that enables data scientists to explore instances of differing environment simulations. This enables users to select and walk through environments that are used to train an AI inference model. Users can specifically teleport into failure cases determined by validator 706 and indicated in results 712 and examine the visible environment in real-time from any angle to diagnose why an algorithm may not be working as expected.

Scenes may then be manipulated from within the VR environment itself. Users use virtual reality controllers to pull up interfaces that allow for assets to be modified, such as through virtual device user interface 406 of FIG. 4. Virtual assets can be moved, scaled, or have materials or styles changed. For example, a first virtual furniture item may be swapped for a second virtual furniture item, lighting may be changed, and arbitrary assets may be selected and added into the environment from repositories of assets that are stored in data generator 606. In this manner, a user may preview a virtual device under test in an immersive environment that enables the user to set up the virtual device and see an indication of the classifications in real-time in the environment. For example, a user testing a virtual device for inference of objects through a mobile phone may hold a virtual mobile phone (as defined by a device emulator) inside the synthetic environment and can look at the synthesized screen of the device to ascertain which objects on the virtual screen of the virtual device in the VR environment are recognized.

Manipulations of the data set from the immersive explorer can be published back out to the data generator and can be used in the next training loop. Thus data scientists have a fully digital platform for working on vision algorithms of real-world environments with the environment generator. When no more errors are found, or errors are within some design criteria, the neural network can be deployed or published.

Figure 8A:
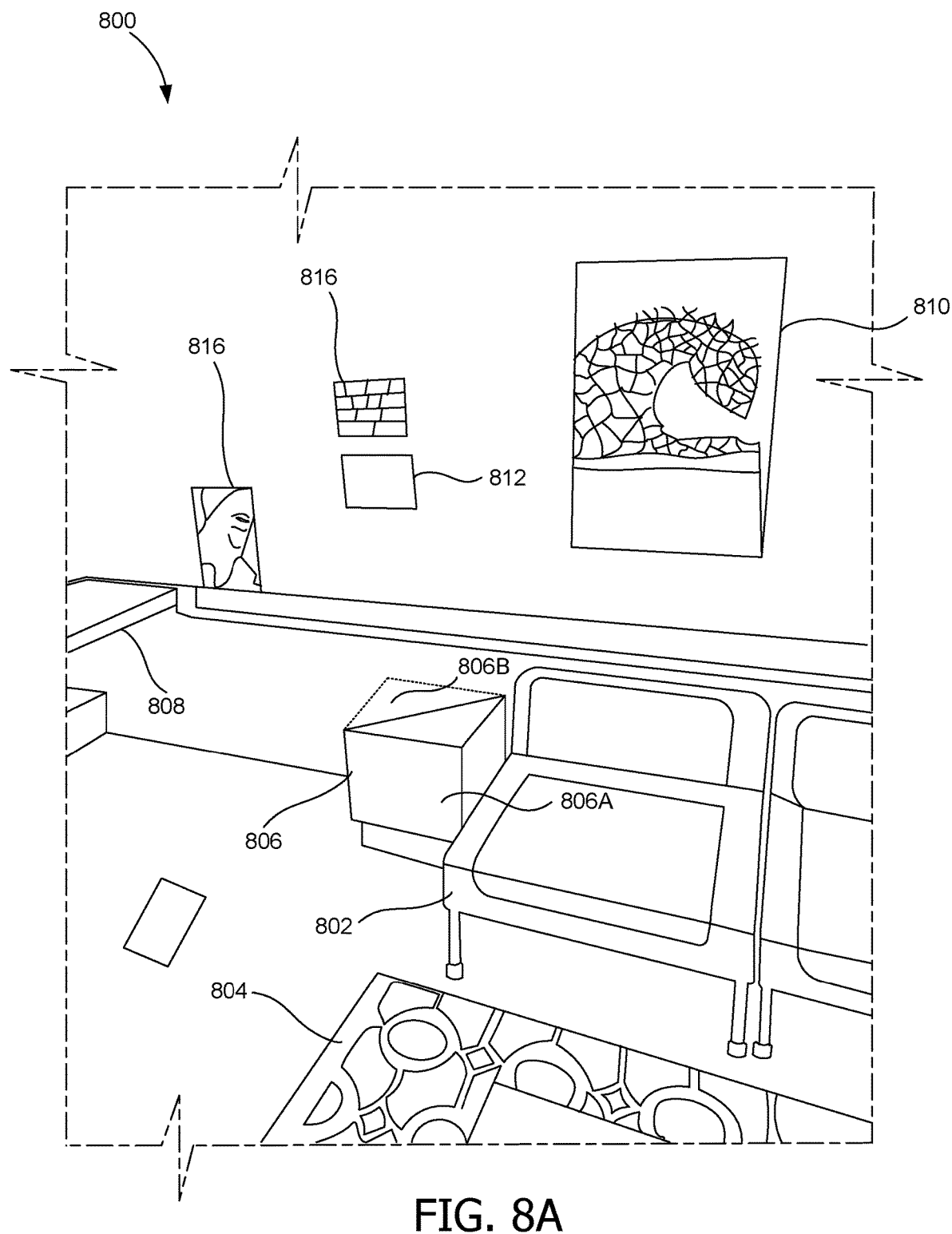
FIGS. 8A and 8B are illustrations of a synthetic scene as may be viewed with a VR headset, with portions of the scene not properly rendered.
Figure 8B:
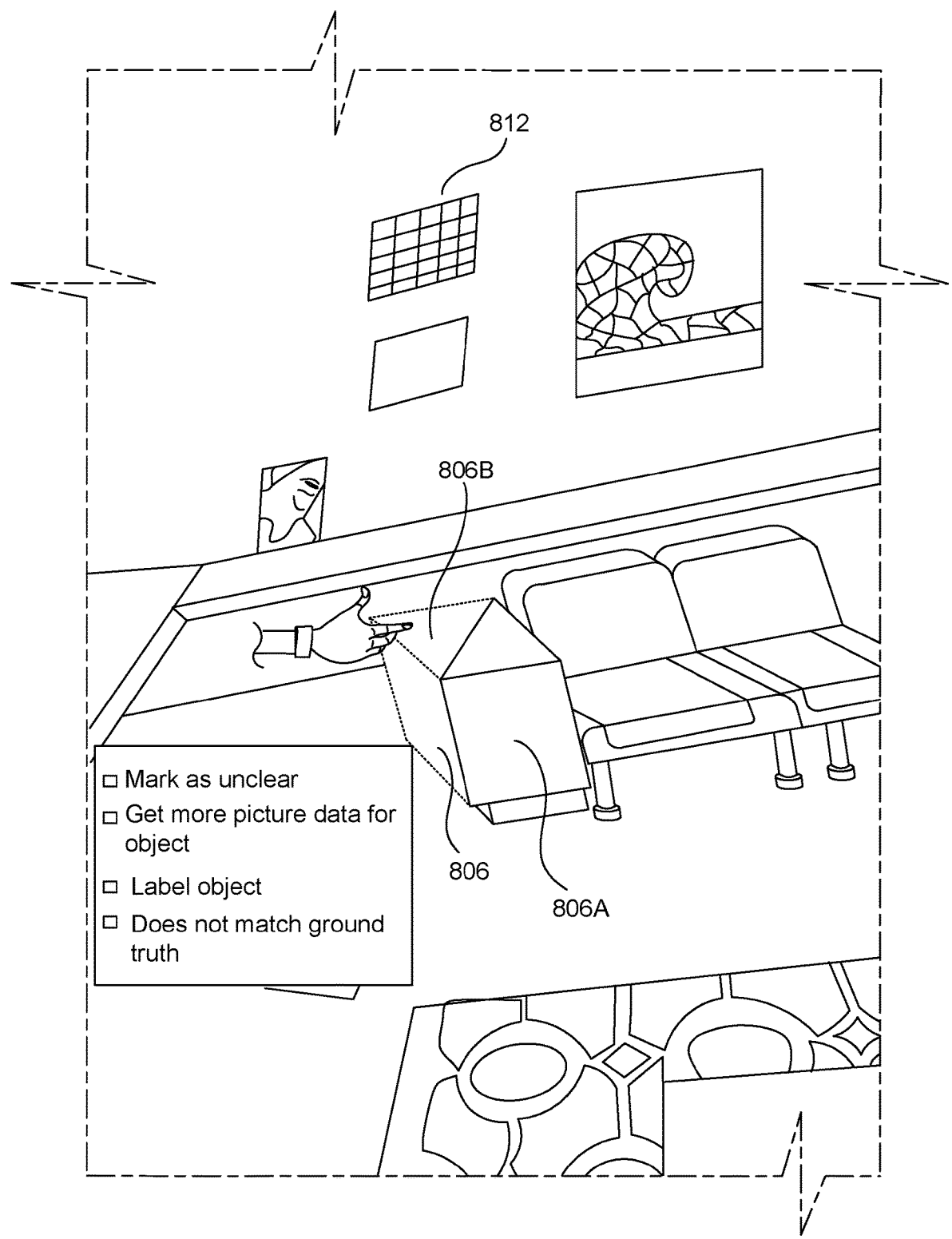

FIGS. 8A and 8B are illustrations of a synthetic scene as may be viewed with a VR headset, with portions of the scene not properly rendered. FIG. 8A shows a synthetic scene 800 that includes a couch 802, a rug 804, a table 806, a counter 808, three properly-rendered pictures 810, and an improperly-rendered picture 812. Table 806 is not rendered, as is thus shown as a rendered portion 806a and an error indication 806b. In some embodiments, an error indication may be accomplished by coloring the pixels corresponding to the error as a first color, such as perhaps red or white. That is, the rendering of an error indication may be accomplished by replacing the pixels in the portion of the scene 800, that was produced by synthetics service 520, with some type of default image or color. As illustrated, the same visual properties of error indication 806b are used for improperly-rendered picture 812.

FIG. 8B shows the same synthetic scene as FIG. 8A, but the user has navigated (virtually) to another angle to further inspect the portions of scene 800 that are not properly rendered (806b and 812). Together, FIGS. 8A and 8B illustrate a possible user's view in an immersive VR experience that may fit this scenario: A user is attempting to train a neural net to detect tables. The user generated VR images including tables for training. Perhaps a hundred or so images of tables were used for training. Later, when the user began an immersive VR experience to evaluate the performance the table recognition, the neural network model was provided with scene 800. A segmented image was created for the table recognition, where a pixel that is part of a detected table object is assigned a value according to an object index (such as perhaps 1 for table, 2 for rug, 3 for chair/sofa, 4 for picture, . . . ). Alternatively, a binary image may have been created for the table recognition, where a pixel that is part of a detected table object is assigned a value of 1, and a pixel that is not part of a detected table object is assigned a value of 0.

The ground truth is known, because it was used to generate the synthetic image data that became scene 800. So a corresponding segmented or binary image is created for the ground truth (or may be considered to be part of the ground truth), and a pixel-by-pixel comparison takes place. A pixel map of errors (where the segmented image pixels corresponding to the neural net results are incorrect) is then produced, which can be used as a mask on the displayed scene 800 to create the colors for error indication 806b and the picture 812. In some embodiments, only error pixels are indicated, such as with the color red, and in some embodiments, correct detections may also be indicated, such as with the color green. In some embodiments, when segmented images are used, only errors are indicated, to prevent the entire scene from being washed out in with a single color (if most pixels are either in error or else are all correct), and in some embodiments, when binary images that indicate only a single class of objects are used, both errors and correct object detections may be indicated.

Figure 9:
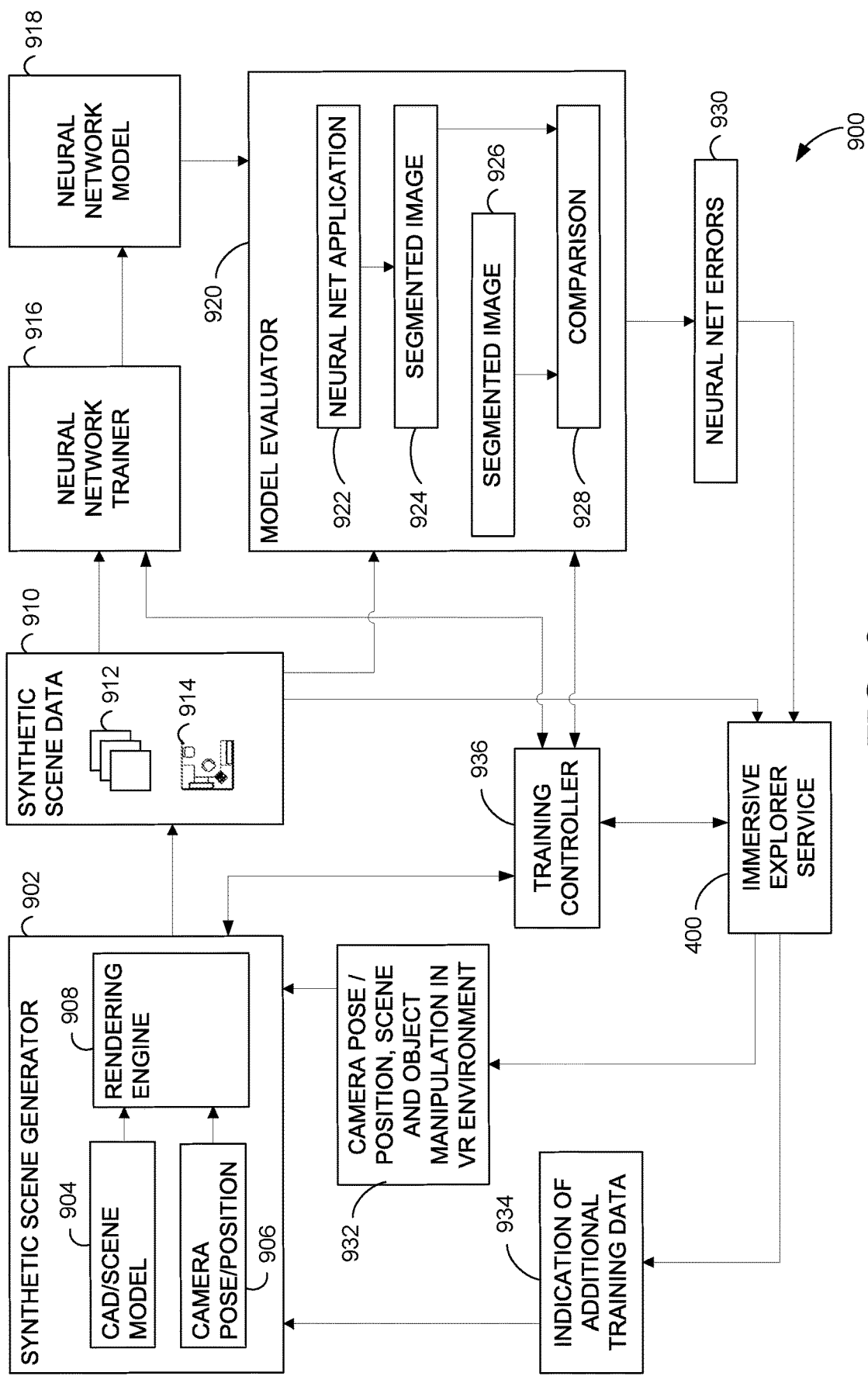
FIG. 9 is a block diagram of an immersive feedback loop suitable for implementing some of the various examples disclosed herein.
Figure 10:
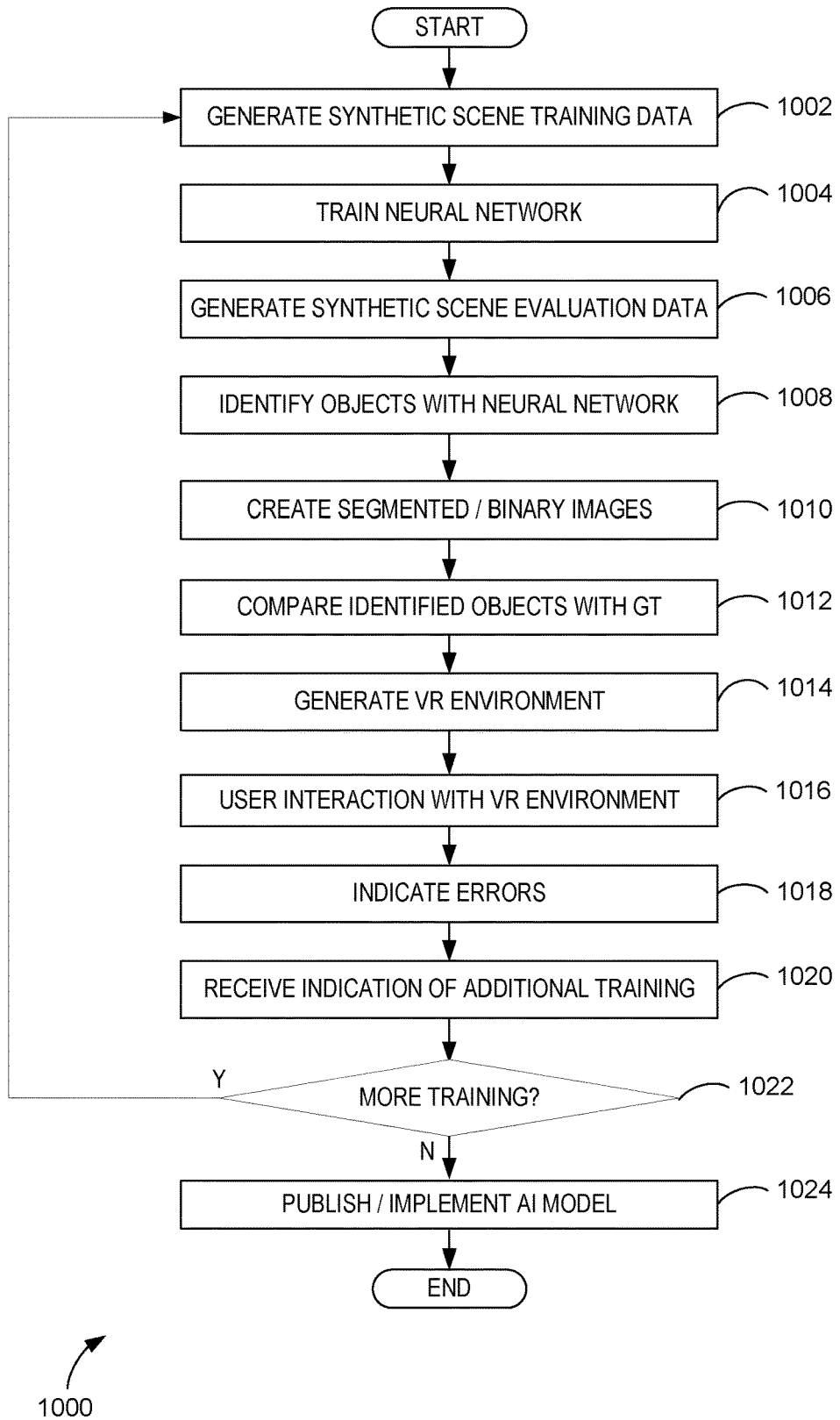
FIG. 10 is a flow chart illustrating an exemplary operation of an immersive feedback loop suitable for implementing some of the various examples disclosed herein; and Corresponding reference characters indicate corresponding parts throughout the drawings.

FIG. 9 is a block diagram of an immersive feedback loop 900 suitable for implementing some of the various examples disclosed herein. Immersive feedback loop 900 may be implemented as a cloud service, in part or in whole, and may further be implemented on one or more computer storage devices having computer-executable instructions stored thereon for improving computer vision through simulated hardware optimization. That is, immersive feedback loop 900 may leverage computing environments described in relation to other figures described herein. An exemplary operation of immersive feedback loop 900 is illustrated in FIG. 10. It should be understood that functionality may be allocated among the different portions in some embodiments differently than is described in this exemplary embodiment.

Immersive feedback loop 900 may be a system for training a neural network, and includes multiple portions. Moving clockwise around the loop, immersive feedback loop 900 comprises a synthetic scene generator 902 for generating synthetic scene data comprising a set of synthetic sensor data and ground truth data, a neural network trainer 916 for training a neural network for machine vision using synthetic scene data, a model evaluator 920 for identifying objects in a set of synthetic sensor data and comparing the identified objects with ground truth data to determine errors, and immersive explorer service 400 for providing feedback to synthetic scene generator 902. A training controller 936 controls iterations and process flow along immersive feedback loop 900.

Also illustrated are data products that are output from one portion and taken as input to another: synthetic scene data 910, a neural network model 918 (which is the ultimate output product of immersive feedback loop 900), neural network errors 930, camera pose/position/manipulation information 932, and indication of additional training 934 that closes the loop. Describing each element in greater detail, synthetic scene generator 902 comprises a CAD/scene model capability 904, and a camera pose/position modeler 906 that provide input to a rendering engine 908. Rendering engine 908 may be similar to synthetics service 520. With these capabilities, synthetic scene generator 902 outputs synthetic scene data 910 that comprises a set of synthetic images 912 and ground truth data 914. In some embodiments, synthetic scene generator 902 may be similar to the combination of scene design service 604 and data generator 606 of FIG. 6. Although this exemplary embodiment is described using synthetic imagery it should be understood that in some embodiments, general synthetic sensor data may be used that includes more than just imagery.

Synthetic scene data 910 can be used in multiple roles, and provides input to both neural network trainer 916 and model evaluator 920 for calculating errors of neural network model 918. That is, a first set of synthetic scene data 910 is sent to neural network trainer 916 to be used for train training neural network model 918 using the first set of synthetic images 912 and first ground truth data 914. For example, neural network model 918 may be a 3D computer vision classifier, and the training involves providing both the imagery and the desired result. A properly-trained neural network model 918 will be the ultimate output product of immersive feedback loop 900. So there is value to the user in ascertaining whether neural network model 918 has been properly trained.

After some training, a user may desire to evaluate the performance of neural network model 918, so ascertain whether more training is required, and if so, on which classes of objects. Thus, a second set of synthetic scene data 910 is sent to model evaluator 920 to be used for calculating errors of neural network model 918. Specifically, a neural net application 922 identifies objects in the second set of synthetic images 912 by using (applying) neural network 918. The result may be either a first binary image indicating pixels showing a portion of an identified object (i.e., the pixels that are part of an image showing a portion of the identified object are set to 1 and other pixels are set to 0), or a first segmented image identifying pixels showing a portion of an object selected from a set of objects (i.e., the pixels that are part of an image showing a portion of the identified object are set to the index value corresponding to that object and other pixels are set to 0 or a different object index value). The first binary image and first segmented image, whichever is produced, is identified within model evaluator 920 as segmented image 924.

Model evaluator 920 additionally calculates a truth model segmented image 926 based on the second ground truth data 914. In some embodiments, second ground truth data 914 already comprises truth model segmented image 926, although in some embodiments, model evaluator 920 calculates it as a separate process. In some embodiments, truth model segmented image 926 may be a binary image for classification of a single object class; in some embodiments, truth model segmented image 926 may be a segmented image with classification indices for multiple object classes. When truth model segmented image 926 has been created (either by synthetic scene generator 902 or model evaluator 920), it may considered as a component of second ground truth data 914. Comparison logic 928 then compares the identified objects in the second set of synthetic images 912 with the second ground truth data 914 to determine errors 930 in the identification of objects by neural network 918. This may be accomplished by a pixel-by-pixel comparison of segmented image 924 with truth model segmented image 926. It should be noted that the description of segmented image elements as pixels is notional, as the segmented images may be more properly described as matrixes with matrix elements corresponding to pixels of some image.

In some embodiments, identified neural network errors 930 are passed to immersive explorer service 400. Immersive explorer service 400 generates a VR environment using second synthetic scene data 912 and indicates errors 930 within the VR environment. A user 603 can experience and interact with the immersive VR environment produced by immersive explorer service 400, as indicated in FIGS. 6 and 7. That is a user can manipulate and edit virtual worlds, such as by moving objects to ascertain whether they are properly rendered or detected from different angles, and/or with different degrees of obscuration. This provides the ability to preview what the AI can generate, based on what it has learned thus far in its training. Errors 930 are indicated. In some embodiments, indicating errors 930 may comprise coloring pixels corresponding to errors 930 with a first color, as indicated in FIGS. 8A and 8B. Although the errors are indicated as white in FIGS. 8A and 8B, in some other embodiments, errors may be indicated as red. In some embodiments, proper pixel classifications may also be indicated with a different color, such as green. That is, within the VR environment, correct identification of objects by neural network 918 may be accomplished by coloring pixels corresponding to the correct identification with a second color different than the first color.

As users manipulate scenes from within the VR environment, arbitrary assets may be selected and added into the environment from repositories. Manipulations of the data set from immersive explorer service 400 are published to synthetic scene generator 902 as message 932 containing information on camera pose/position, scene and object manipulation in VR environment. Message 932 is used for generating another round of synthetic scene data 910 that can be passed through model evaluator 920 to produce a new version of neural network errors 930, as well as new scene data that is used for updating the VR environment for the user. That is, immersive explorer service 400 sends VR viewing information to synthetic scene generator 902 for generating synthetic scene data 910 for generating the VR environment. When the user is ready to indicate more training, immersive explorer service 400 receives the user's feedback indicating additional training data corresponding to the indicated errors 930; and then passes along indication of additional training data 934 to synthetic scene generator 902. Indication of additional training data 934 can be used to generate another set of synthetic scene data 910 for neural network trainer 916 to use for training neural network model 918. In some embodiments, this completes the feedback training loop for immersive feedback loop 900.

A training controller 936 controls iterations and process flow along immersive feedback loop 900. As indicated, training controller 936 interfaces with each of synthetic scene generator 902, neural network trainer 916, model evaluator 920, and immersive explorer service 400, to monitor progress and operation. Specifically, training controller 936 monitors feedback from immersive explorer service 400 indicating whether additional training data is indicated by the user or, instead whether no additional synthetic scene training data is indicated. When no additional synthetic scene training data is indicated, this may be an indication that the user considers neural network 918 sufficiently trained and ready for publishing or deployment for implementation of the AI model. In this manner, training controller 936 selectively iterates feedback loop 900. Thus, data scientists may advantageously use a fully digital platform for working on vision algorithms of real-world environments with an environment generator.

FIG. 10 is a flow chart diagram of a work flow 1000 illustrating an exemplary operation of an immersive feedback loop, such as immersive feedback loop 900, which is suitable for implementing some of the various examples disclosed herein. Work flow 1000 with a generate synthetic scene training data step 1002; the synthetic scene training data is a first synthetic scene data that comprises a first set of synthetic images and a first ground truth data. Next is a train neural network step 1004; in some embodiments the training involves training a neural network for machine vision using the first synthetic scene data. After some training, the neural network may be evaluated, so additional synthetic scene data is created using a generate synthetic scene evaluation data step 1006. The synthetic scene evaluation data is a second synthetic scene data comprising a second set of synthetic images and a second ground truth data. At this point, the (at least partially) trained neural network may be used in an identify objects with neural network step 1008 that may be considered to be a joint operation with step 1006, in some embodiments. Although this exemplary embodiment is described using synthetic imagery it should be understood that in some embodiments, general synthetic sensor data may be used that includes more than just imagery.

The identifications may be cast as a set of binary or segmented images in a create segmented/binary images step 1010. Thus, identifying objects in the second set of synthetic images may comprise creating a first binary image indicating pixels showing a portion of an object, and the second ground truth data includes a second binary image indicating pixels showing a portion of an object. Alternatively, identifying objects in the second set of synthetic images may comprise creating a first segmented image identifying pixels showing a portion of an object selected from a set of objects, and the second ground truth data comprises a second segmented image identifying pixels showing a portion of an object selected from the set of objects.

With the neural network detections now made, and using the ground truth, a compare identified objects with GT (ground truth) step 1012 comparing the identified objects in the second set of synthetic images with the second ground truth data to determine errors in the identification of objects by the neural network. These errors may be indicated to a user at the proper time within an immersive VR environment. So a generate VR environment step 1014 uses the second synthetic scene data to create an interactive immersive VR environment for the user. A user interaction with VR environment step 1016 permits a user to virtually move within the VR environment and manipulate objects to test out the performance of the trained neural network. As the user moves around within the VR environment, additional synthetic scene evaluation data is generated (via step 1006) by determining a VR viewing pose; and generating the synthetic scene evaluation data according to the VR viewing pose.

During the manipulation and editing of the virtual world, errors may become visibly apparent in some of the object detections by the neural network. Thus, responsive to the detection of errors in the comparison (step 1012), errors within the VR environment may be indicated with an indicate errors step 1018. In some embodiments, indicating the errors within the VR environment may comprise coloring pixels corresponding to the errors with a first color. In some embodiments, correct identification of objects by the neural network may be indicated, within the VR environment, by coloring pixels corresponding to the correct identification with a second color different than the first color. For example, red or white may indicate error, whereas green indicates a correct detection.

When a user identifies errors for a particular class of objects, the user may wish to specify that more training data is needed for that class of objects. So, in a receive indication of additional training step 1020, the user provides feedback indicating additional training data corresponding to the indicated errors (for the particular object). In a more training needed decision step 1022, responsive to receiving the indication of additional training data, flow chart 1000 returns generate synthetic scene training data step 1002 to generating a third synthetic scene data comprising a third set of synthetic images and a third ground truth data, wherein the third synthetic scene data comprises the indicated additional training data (i.e., the indicated object having errors). Then, work flow 1000 flows back to train neural network step 1004 for training the neural network for machine vision using the third synthetic scene data.

Work flow 1000 may be set to iterate, until no additional synthetic scene training data is indicated, to perform the following operations: generate synthetic scene training data, train the neural network on the synthetic scene training data, generate synthetic scene evaluation data, and generate a VR environment using the synthetic scene evaluation data. When the user perceives there is not more need for additional training, more training needed decision step 1022 will detect the user's indication of no additional training needed, and proceed to publish/implement AI model step 1024, in which the now-completed neural network model is made available for use.

Additional Examples

Some aspects and examples disclosed herein are directed to training a neural network using a fully immersive VR experience. Such embodiments use a synthetic scene generator that generates synthetic scene data comprising a first set of synthetic sensor data and a first ground truth data and a second set of synthetic sensor data and second ground truth data. A neural network trainer trains a neural network for machine vision using the first set of synthetic sensor data and ground truth data. A model evaluator identifies objects in the second set of synthetic sensor data by using the neural network, and compares the identified objects in the second set of synthetic sensor data with the second ground truth data to determine errors in the identification of objects by the neural network. And an immersive explorer service for: generating a VR environment using the second synthetic scene data, indicating the errors within the VR environment; receiving feedback indicating additional training data corresponding to the indicated errors; and indicating the additional training data to the synthetic scene generator.

Additional aspects and examples disclosed herein are directed to a process for training a neural network. In some embodiments, the process includes: generating a first synthetic scene data comprising a first set of synthetic sensor data and a first ground truth data; training a neural network for machine vision using the first synthetic scene data; generating a second synthetic scene data comprising a second set of synthetic sensor data and a second ground truth data; identifying objects in the second set of synthetic sensor data by using the neural network; generating a VR environment using the second synthetic scene data; comparing the identified objects in the second set of synthetic sensor data with the second ground truth data to determine errors in the identification of objects by the neural network; responsive to the comparison, indicating the errors within the VR environment; receiving feedback indicating additional training data corresponding to the indicated errors; responsive to receiving the indication of additional training data, generating a third synthetic scene data comprising a third set of synthetic sensor data and a third ground truth data, the third synthetic scene data comprising the indicated additional training data; and training the neural network for machine vision using the third synthetic scene data.

Additional aspects and examples disclosed herein are directed to a one or more computer storage devices having computer-executable instructions stored thereon for training a neural network, which, on execution by a computer, cause the computer to perform operations, the instructions comprising: a synthetic scene generator component for generating synthetic scene data comprising a set of synthetic sensor data and ground truth data; a neural network trainer component for training a neural network for machine vision using synthetic scene data; a model evaluator component for identifying objects in the second set of synthetic sensor data using the neural network and comparing the identified objects in the second set of synthetic sensor data with the second ground truth data to determine errors in the identification of objects by the neural network; and an immersive explorer service component for generating a VR environment using the second synthetic scene data, indicating the errors within the VR environment, receiving feedback indicating additional training data corresponding to the indicated errors, and indicating the additional training data to the synthetic scene generator.

In some examples, objects are identified in the second set of synthetic sensor data by creating a first binary image indicating pixels showing a portion of an object, and wherein the second ground truth data comprises a second binary image indicating pixels showing a portion of an object.

In some examples, objects are identified in the second set of synthetic sensor data using the neural network through: creating a first segmented image identifying pixels showing a portion of an object selected from a set of objects, and wherein the second ground truth data comprises a second segmented image identifying pixels showing a portion of an object selected from the set of objects.

In some examples, the immersive explorer service sends VR viewing information to the synthetic scene generator for generating synthetic scene data for generating the VR environment.

In some examples, indicating the errors within the VR environment includes coloring pixels corresponding to the errors with a first color.

In some examples, correct identification of objects are indicated in the VR environment by coloring pixels corresponding to the correct identification with a second color different than the first color.

In some examples, the second synthetic scene data is generated by determining a VR viewing pose and generating the second synthetic scene data according to the VR viewing pose.

While the aspects of the disclosure have been described in terms of various examples with their associated operations, a person skilled in the art would appreciate that a combination of operations from any number of different examples is also within scope of the aspects of the disclosure.

Example Operating Environment

Although described in connection with an example computing device 100, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The examples illustrated and described herein, as well as examples not specifically described herein but within the scope of aspects of the disclosure, constitute exemplary means for providing an immersive feedback loop for improving AI in a cloud computing environment. For example, the elements described in FIGS. 4-7 and 9, such as when encoded to perform the operations illustrated in FIG. 10, constitute exemplary means for providing an immersive feedback loop for improving AI.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for training a neural network, the system comprising:
    a synthetic scene generator for generating first synthetic scene data comprising a first set of synthetic sensor data and first ground truth data, and second synthetic scene data comprising a second set of synthetic sensor data and second ground truth data;
    a neural network trainer for training a neural network for machine vision using the first set of synthetic sensor data and the first ground truth data;
    a model evaluator for:
        identifying objects in the second set of synthetic sensor data by using the neural network, and
        comparing the identified objects in the second set of synthetic sensor data with the second ground truth data to determine errors in the identification of objects by the neural network; and
    an immersive explorer service for:
        generating a virtual reality (VR) environment using the second synthetic scene data,
        indicating the errors within the VR environment;
        receiving feedback indicating additional training data corresponding to the indicated errors; and
        indicating the additional training data to the synthetic scene generator.

2. The system of claim 1 wherein identifying objects in the second set of synthetic sensor data by using the neural network comprises:
    creating a first binary image indicating pixels showing a portion of an object, and
    wherein the second ground truth data comprises a second binary image indicating pixels showing a portion of an object.

3. The system of claim 1 wherein identifying objects in the second set of synthetic sensor data by using the neural network comprises:
    creating a first segmented image identifying pixels showing a portion of an object selected from a set of objects, and
    wherein the second ground truth data comprises a second segmented image identifying pixels showing a portion of an object selected from the set of objects.

4. The system of claim 1 wherein the immersive explorer service sends VR viewing information to the synthetic scene generator for generating synthetic scene data for generating the VR environment.

5. The system of claim 1 wherein indicating the errors within the VR environment comprises coloring pixels corresponding to the errors with a first color.

6. The system of claim 5 wherein the immersive explorer service further indicates, within the VR environment, correct identification of objects by the neural network by coloring pixels corresponding to the correct identification with a second color different than the first color.

7. The system of claim 1 further comprising a training controller for selectively iterating a feedback loop, the feedback loop comprising:
    the synthetic scene generator;
    the neural network trainer;
    the model evaluator; and
    the immersive explorer service.

8. A method of training a neural network, the method comprising:
    generating a first synthetic scene data comprising a first set of synthetic sensor data and a first ground truth data;
    training a neural network for machine vision using the first synthetic scene data;
    generating a second synthetic scene data comprising a second set of synthetic sensor data and a second ground truth data;
    identifying objects in the second set of synthetic sensor data by using the neural network;
    generating a virtual reality (VR) environment using the second synthetic scene data;
    comparing the identified objects in the second set of synthetic sensor data with the second ground truth data to determine errors in the identification of objects by the neural network;
    responsive to the comparison, indicating the errors within the VR environment;
    receiving feedback indicating additional training data corresponding to the indicated errors;
    responsive to receiving the indication of additional training data, generating a third synthetic scene data comprising a third set of synthetic sensor data and a third ground truth data, the third synthetic scene data comprising the indicated additional training data; and
    training the neural network for machine vision using the third synthetic scene data.

9. The method of claim 8 wherein identifying objects in the second set of synthetic sensor data by using the neural network comprises:
    creating a first binary image indicating pixels showing a portion of an object, and
    wherein the second ground truth data comprises a second binary image indicating pixels showing a portion of an object.

10. The method of claim 8 wherein identifying objects in the second set of synthetic sensor data by using the neural network comprises:

creating a first segmented image identifying pixels showing a portion of an object selected from a set of objects, and wherein the second ground truth data comprises a second segmented image identifying pixels showing a portion of an object selected from the set of objects.

11. The method of claim 8 wherein generating the second synthetic scene data comprises:
   determining a VR viewing pose; and
   generating the second synthetic scene data according to the VR viewing pose.

12. The method of claim 8 wherein indicating the errors within the VR environment comprises coloring pixels corresponding to the errors with a first color.

13. The method of claim 12 further comprising:
   indicating, within the VR environment, correct identification of objects by the neural network by coloring pixels corresponding to the correct identification with a second color different than the first color.

14. The method of claim 12 further comprising:
   iterating, until no additional synthetic scene training data is indicated through performing:
      generating synthetic scene training data;
      training the neural network on the synthetic scene training data;
      generating synthetic scene evaluation data;
      generating a VR environment using the synthetic scene evaluation data;
      indicating, within the VR environment, errors in identification of objects by the neural network; and
      receiving feedback indicating additional synthetic scene training data or indicating no additional synthetic scene training data.

15. One or more computer storage devices having computer-executable instructions stored thereon for training a machine vision neural network, which, on execution by a computer, cause the computer to perform operations, the instructions comprising:
   a synthetic scene generator component for generating first synthetic scene data comprising a first set of synthetic sensor data and first ground truth data, and second synthetic scene data comprising a second set of synthethic sensor data and second ground truth data;
   a neural network trainer component for training a neural network for machine vision using the first synthetic scene data;
   a model evaluator component for:
      identifying objects in the second set of synthetic sensor data by using the neural network, and
      comparing the identified objects in the second set of synthetic sensor data with the second ground truth data to determine errors in the identification of objects by the neural network; and
   an immersive explorer service component for:
      generating a virtual reality (VR) environment using the second synthetic scene data,
      indicating the errors within the VR environment;
      receiving feedback indicating additional training data corresponding to the indicated errors; and
      storing the additional training data in association with the second synthetic scene data.

16. The one or more computer storage devices of claim 15 wherein identifying objects in the second set of synthetic sensor data by using the neural network comprises:
   creating a first binary image indicating pixels showing a portion of an object, and
   wherein the second ground truth data comprises a second binary image indicating pixels showing a portion of an object.

17. The one or more computer storage devices of claim 15 wherein identifying objects in the second set of synthetic sensor data by using the neural network comprises:
   creating a first segmented image identifying pixels showing a portion of an object selected from a set of objects, and
   wherein the second ground truth data comprises a second segmented image identifying pixels showing a portion of an object selected from the set of objects.

18. The one or more computer storage devices of claim 15 wherein the immersive explorer service component sends VR viewing information to the synthetic scene generator component for generating synthetic scene data for generating the VR environment.

19. The one or more computer storage devices of claim 15 wherein indicating the errors within the VR environment comprises coloring pixels corresponding to the errors with a first color.

20. The one or more computer storage devices of claim 19 wherein the immersive explorer service component further indicates, within the VR environment, correct identification of objects by the neural network by coloring pixels corresponding to the correct identification with a second color different than the first color.

* * * * *